United States Patent [19]

Dietiker

[11] Patent Number: 5,345,963
[45] Date of Patent: Sep. 13, 1994

[54] MODULATING PRESSURE REGULATOR WITH SHAPE MEMORY ALLOY ACTUATOR

[75] Inventor: Paul Dietiker, Redondo Beach, Calif.

[73] Assignee: Honeywell Inc., Minneapolis, Minn.

[21] Appl. No.: 41,440

[22] Filed: Mar. 31, 1993

[51] Int. Cl.$^5$ .............................................. G05D 7/06
[52] U.S. Cl. .................................... 137/12; 137/489; 251/11
[58] Field of Search .................... 137/12, 489; 251/11

[56] References Cited

U.S. PATENT DOCUMENTS

| | | | |
|---|---|---|---|
| 3,151,834 | 10/1964 | Ray | 251/11 |
| 3,215,396 | 11/1965 | Bergsma | 251/11 |
| 4,219,181 | 8/1980 | Joelson | 251/11 X |
| 4,284,235 | 8/1981 | Diermayer et al. | |
| 4,774,923 | 10/1988 | Hayashi | |
| 4,790,343 | 12/1988 | Mochizuki | |
| 4,790,352 | 12/1988 | Dietiker | |
| 4,979,672 | 12/1990 | Abujudom | |
| 5,071,064 | 12/1991 | Abujudom | |

OTHER PUBLICATIONS

Honeywell Inc. Engineering Specification ES 5232 for the V7335 Modureg pressure regulator, seven sheets text and drawing (Aug 8, 1986).

Honeywell Inc. Product Information Brochure, Form No. 68-0107-1 for VR8300 Continuous Pilot Dual Automatic Combination Gas Valve Controls (Rev. 4-91).

Honeywell Inc. Product Information Brochure, Form No. 68-0046-3 for the VR8200 Combination Gas Controls (Rev. 2-92).

McGraw Hill Encyclopedia of Science and Technology, 7th Edition, pp. 357-359 (1992).

*Primary Examiner*—Gerald A. Michalsky
*Attorney, Agent, or Firm*—Charles L. Rubow

[57] ABSTRACT

An electrically controlled modulating pressure regulator in which a main valve regulates fluid flow between an inlet and an outlet in response to a control pressure produced by a servo valve which is responsive to the outlet pressure and the force applied by a regulator spring to a diaphragm carrying the servo valve closure element. Deformation of the regulator spring can be varied by an electrical actuator in the form of a wire segment of a shape memory alloy through which electric current can be passed to vary its temperature and length.

20 Claims, 4 Drawing Sheets

MODULATING PRESSURE REGULATOR WITH SHAPE MEMORY ALLOY ACTUATOR

BACKGROUND OF THE INVENTION

The present invention relates generally to fluid pressure regulators, and more specifically to pressure regulating valves whose set point pressures can be electrically modulated.

Applications have existed for some time for pressure regulating valves capable of regulating to either of two electrically selected pressures, or to any pressure within an operating pressure range. In general, these applications have been somewhat specialized, and the required volumes relatively small, thus providing little incentive for exploring nontraditional designs or technologies. Typically, traditional designs for two stage or modulating pressure regulator valves have employed a solenoid actuator to control the force supplied by a regulator spring.

A pressure regulating valve application which has begun to receive increasing interest is in connection with fuel gas valves for small furnaces, such as those used in single family residences. Certain U.S. furnace manufacturers have developed high efficiency furnace designs which rely on two stages of furnace operation. When heat is first called for and under moderate heat requirements, the furnace is fired at a low to moderate rate. If firing at that rate does not provide the heat output required for the existing conditions, firing is stepped up to a higher rate.

Along with the increasing demand for in such furnaces has come increasing interest in an improved two stage or modulating fuel gas valve design which avoids certain disadvantages of the existing solenoid actuator based designs. The desired improvements include smaller size, quieter operation, simpler construction with fewer moving parts, and lower cost. Conventional solenoid actuators have been relatively bulky, and tend to be noisy in operation. Two sources of operating noise include abrupt movement of the solenoid plunger, with attendant vibration when it reaches the limits of its travel, and buzzing or humming if the solenoid is energized with alternating current.

In Europe and Japan there is also increasing interest in higher efficiency fuel gas fired furnaces. The preferred design approach in those areas appears to be modulation of the firing level, in contrast to a two stage approach. However, either design approach requires a gas valve capable of regulating to an electrically selected pressure.

The applicant has devised an improved design for a two stage or modulating pressure regulating valve based on unique technology by which the short comings of prior art designs can be avoided. In particular the applicant's design is compact in size, quiet in operation, has a minimum number of moving parts, and can be produced at low cost.

SUMMARY OF THE INVENTION

The invention is an electrically controlled modulating pressure regulator and pressure regulating method in which an actuator formed of a shape memory alloy is arranged to vary the deformation of a regulator spring in a servo valve, the position of whose closure member is also dependent on the regulator outlet pressure. The servo valve is operable to produce a control pressure which controls operation of a main valve between a fluid inlet and the fluid outlet. The configuration of the shape memory alloy actuator can be changed by varying its temperature, which may be accomplished by passing an electric current of suitable magnitude through the actuator. The actuator may be in the form of a wire segment of shape memory alloy material, the ends of the segment being held in a fixed relationship to a housing of the regulator. An intermediate location on the wire segment acts on the regulator spring through a suitable linkage.

DESCRIPTION OF THE PREFERRED EMBODIMENTS

Figure 1:
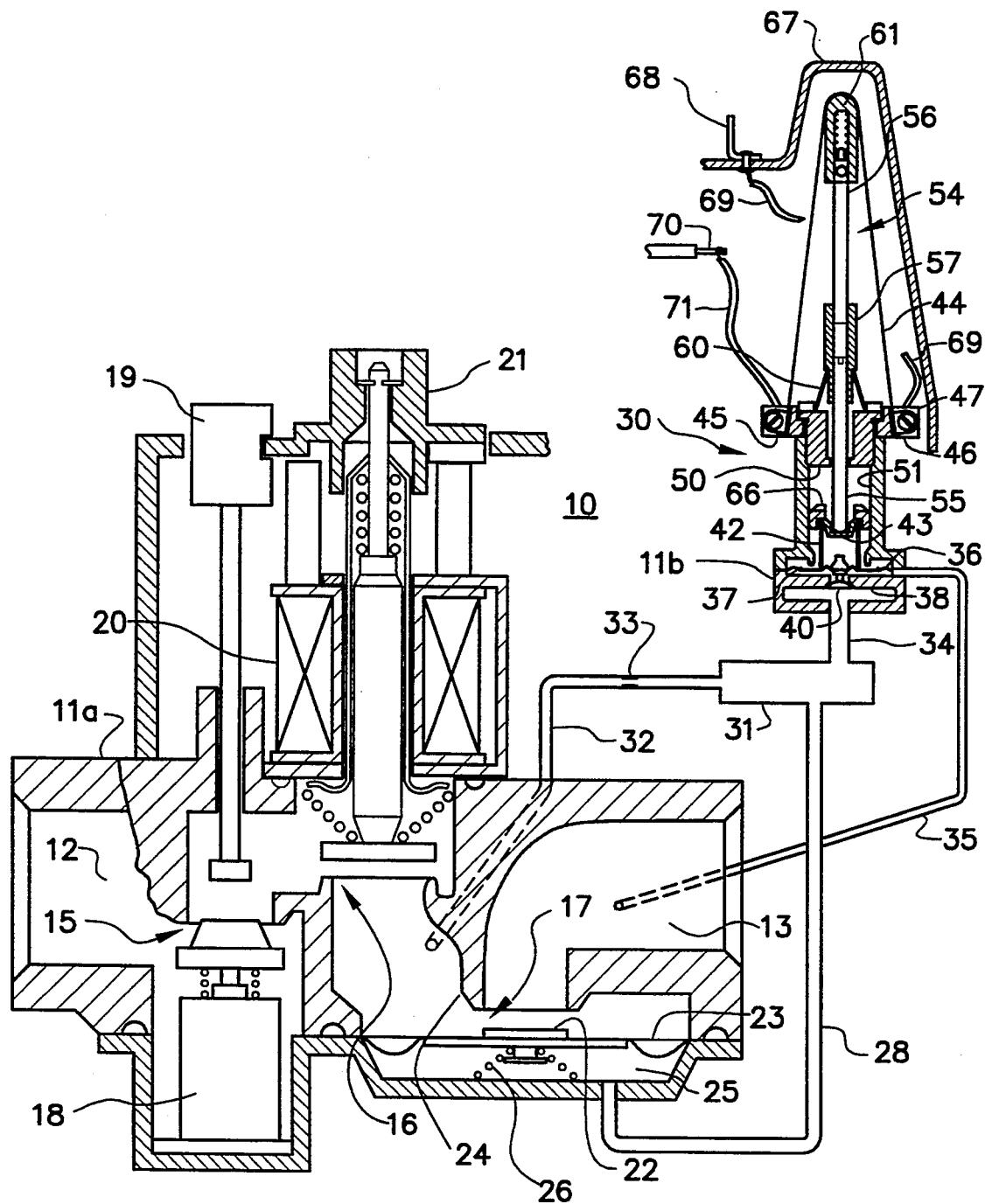
FIG. 1 is a partially schematic cross sectional view of a first embodiment of a gas valve incorporating a two stage or modulating pressure regulator in accordance with the applicant's invention.

In FIG. 1, reference numeral 10 generally identifies a fuel gas valve, which, except for the pressure regulating portion, is similar to a gas valve of conventional design shown and described in detail in U.S. Pat. No. 4,790,352 issued Dec. 13, 1988 to the applicant in the present application. Valve 10 includes a housing, which, for simplicity of illustration, is shown in two parts identified by reference characters 11a and 11b. As actually implemented, housing parts 11a and 11b would most likely be integrated into a single housing means.

As shown in FIG. 1, housing 11 defines a fluid inlet passageway 12 and a fluid outlet passageway 13 connected through a series of three valves generally identified by reference numerals 15, 16 and 17, of which valve 17 will hereinafter be referred to as the main valve.

Valve 15 functions as a safety valve having a power unit 18 which may be controlled by a flame sensing thermocouple, whereby, valve 15 is normally held open only if a satisfactory flame is established in a furnace of which gas valve 10 is a part. For purposes of initially establishing the flame, valve 15 may be temporarily manually held open by means of a reset button 19.

Valve 16 is controlled by a solenoid 20, provided a control knob 21 is properly positioned, in response to a heat demand signal which may be produced by a thermostat. Thus, if permitted by the apparatus associated with knob 21, solenoid 20 will open valve 16 when there is a demand for heat, and will close valve 16 when the demand for heat is satisfied.

Main valve 17 includes a valve closure member 22 carried on a diaphragm actuator 23. Closure member 22 cooperates with a main valve seat 24 to vary the flow of gas between inlet passageway 12 and outlet passageway 13, provided valves 15 and 16 are open.

A pressure chamber 25 is formed between housing 11 and a first side of diaphragm 23 which is on the opposite side of diaphragm 23 from valve seat 24. A compression spring 26 within pressure chamber 25 between housing 11 and the first side of diaphragm 23 biases closure member 22 toward valve seat 24 to normally maintain valve 17 in a closed state.

Valve 17, however, may be variably opened by a pressure differential between opposite sides of diaphragm 23 as follows. Assuming valves 15 and 16 are open, the side of diaphragm 23 on which closure member 22 is mounted is subjected to the inlet gas pressure, which tends to open valve 17. However, the force produced by spring 26 is sufficient to keep valve 17 closed under normal inlet gas pressure unless the pressure in pressure chamber 25 is significantly less than the inlet gas pressure. The control pressure in chamber 25 is communicated thereto through a control pressure passageway 28, and is determined by the pressures in inlet passageway 12, outlet passageway 13 and an electrically controlled servo valve generally identified by reference numeral 30.

Specifically, the pressure in inlet passageway 12 is transmitted to a manifold 31 through a first conduit 32 containing a flow restrictor 33. Manifold 31 is connected directly to pressure chamber 25 through control passageway or conduit 28. Manifold 31 is also connected to outlet passageway 13 through a conduit 34, servo valve 30 and a conduit 35.

Servo valve 30 includes a valve actuator in the form of a diaphragm 36 which cooperates with housing 11 to form a pressure chamber 37 between a first side of the diaphragm and a portion of the housing. Pressure chamber 37 is separated into two compartments by a stationary valve seat 38, the two compartments being connected to conduits 34 and 35 respectively, whereby valve seat 38 provides for fluid communication between conduits 34 and 35.

Diaphragm 36 carries a valve closure member 40 on a stem 41 (see FIG. 2) which extends through valve seat 38 to control fluid flow between conduits 34 and 35. The deflection of diaphragm 36 and the position of closure member 40 relative to valve seat 38 are controlled by the pressure in outlet passageway 13, as communicated through conduit 35, and the force exerted on the opposite side of diaphragm 36 by a regulator spring 42. Regulator spring 42 has a first end seated on the second side of diaphragm 36 and a second end seated on an adjustable spring retainer 43.

In operation, for any fixed position of spring retainer 43, if the pressure in outlet passageway 13 decreases, the pressure on the side of the diaphragm opposite spring 42 likewise decreases, and spring 42 deflects diaphragm 36 downwardly, thus moving closure member 40 away from valve seat 38. This opens servo valve 30 and decreases the pressure in conduit 28 and pressure chamber 25 by allowing the pressure in manifold 31 to bleed off to outlet passageway 13. The reduced pressure in pressure chamber 25 causes diaphragm 23 to deflect downwardly, thus opening main valve 17 and restoring the pressure in outlet passageway 13 to the value determined by the setting of adjustable spring retainer 43.

The position of adjustable spring retainer 43 is electrically controlled by an actuator including a wire segment 44 of a shape memory alloy material. The composition and microstructure of the shape memory alloy are such that it undergoes a thermoelastic transformation from a martensite phase to an austenits phase as the material is heated to above a transition temperature, and undergoes an opposite transformation as the material is cooled to below the transition temperature. The composition chosen for wire segment 44 is such that, as the wire segment is heated to 150° C. it will become 3-5 percent shorter, and as it is cooled below a temperature of 150° C. it will return to its original length.

The ends of wire segment 44 are fixed with respect to housing 11b by attachment tabs 45 and 46 which are attached to an insulating mounting ring 47 by means of screws 48 and 49 respectively. Mounting ring 47 is fixed to housing 11b by means of an externally threaded annular nut 50 which mates with an internally threaded bore 51 in housing 11b.

Wire segment 44, at an intermediate location thereon, passes over the end of a push rod assembly generally identified by reference numeral 54, which extends between the intermediate location on the wire segment and spring retainer 43. As shown, push rod assembly 54 is in two sections 55 and 56, each having a threaded end thereon, the threaded ends mating with an internally threaded sleeve 57, whereby the overall length of the push rod assembly can be adjusted.

A conical compression spring 60 is located between nut 50 and a shoulder on sleeve 57 to urge push rod assembly 54 toward the intermediate location on wire segment 44 so as to keep the wire segment in tension. For purposes of minimizing performance deterioration of wire segment 44, it is important that lengthening of the wire segment as it is cooled occur with the wire segment in tension.

Push rod assembly 54 is provided with a telescoping feature in the form of a closed tubular cap 61 which fits over the end of push rod section 56, the intermediate location of wire segment 44 passing over the closed end of cap 61. Cap 61 is spring biased to an extended position by means of a compression spring 62 between the end of push rod section 56 and the inside of the closed end of the cap. A pin 63, which extends transversely through a portion of push rod section 56 within cap 61, mates with a pair of opposing slots 64 in the cap to retain it in place.

A second annular externally threaded nut 66 is provided within threaded bore 51, and functions as a stop for spring retainer 43. This feature provides a minimum compression setting for regulator spring 42, which, in turn, results in a minimum regulated pressure limit for pressure regulator valve 10.

Reference numeral 67 identifies a cover over the wire segment actuator-push rod assembly. An electrical terminal 68 is provided on cover 67, and is connected to one end of wire segment 44 by means of a pig tail lead 69, shown partially broken away in FIG. 1 and 2. The other end of wire segment 44 is connected to a second electrical terminal 70 through a pig tail lead 71. Terminals 68 and 70 and pig tail leads 69 and 71 provide means to allow electric current to flow through wire segment 44 to change its temperature so as to achieve the desired control function.

Figure 3:
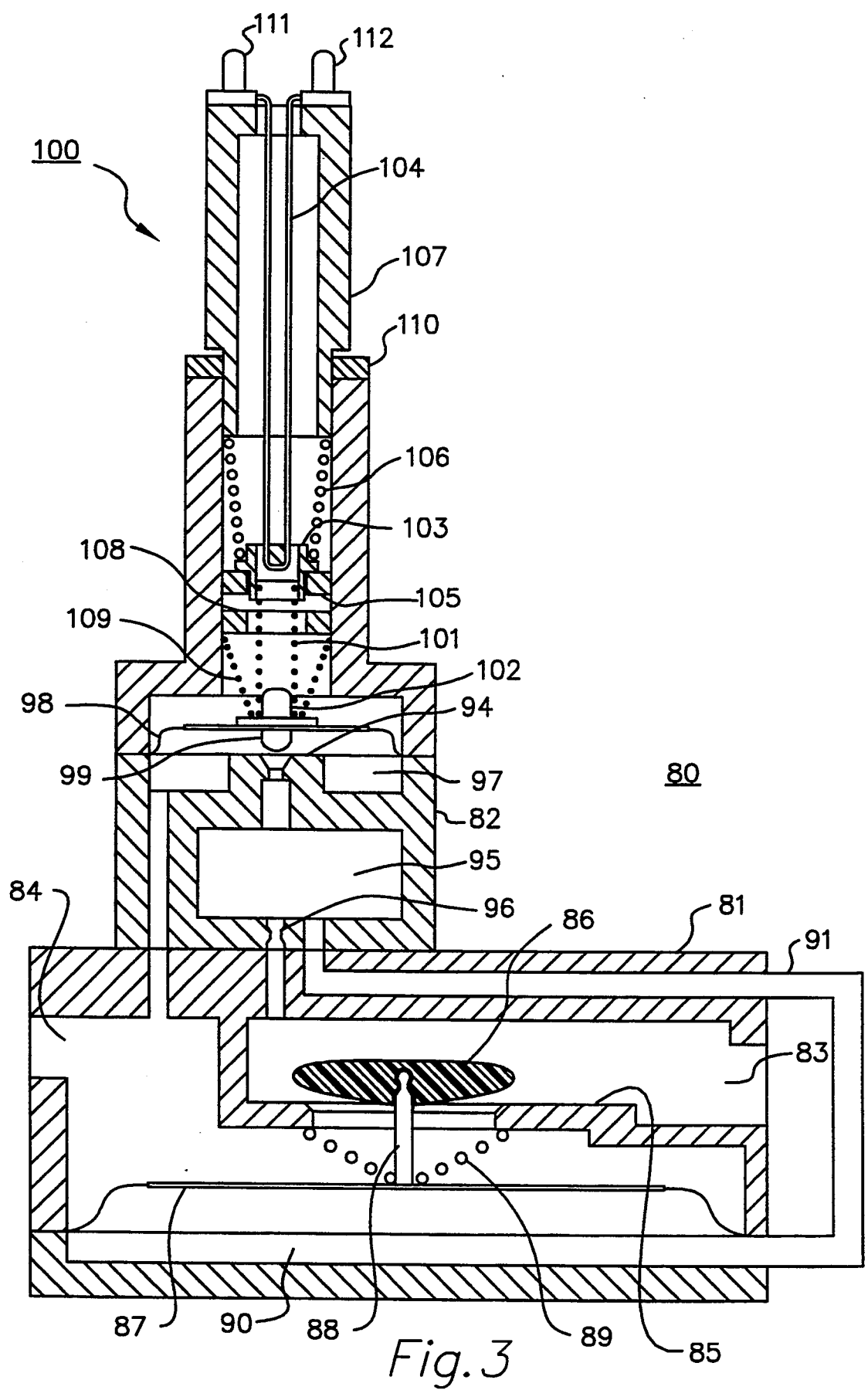
FIG. 3 is a partially schematic cross sectional view of a second embodiment of a two stage or modulating pressure regulator in accordance with the applicant's invention.
Figure 4:
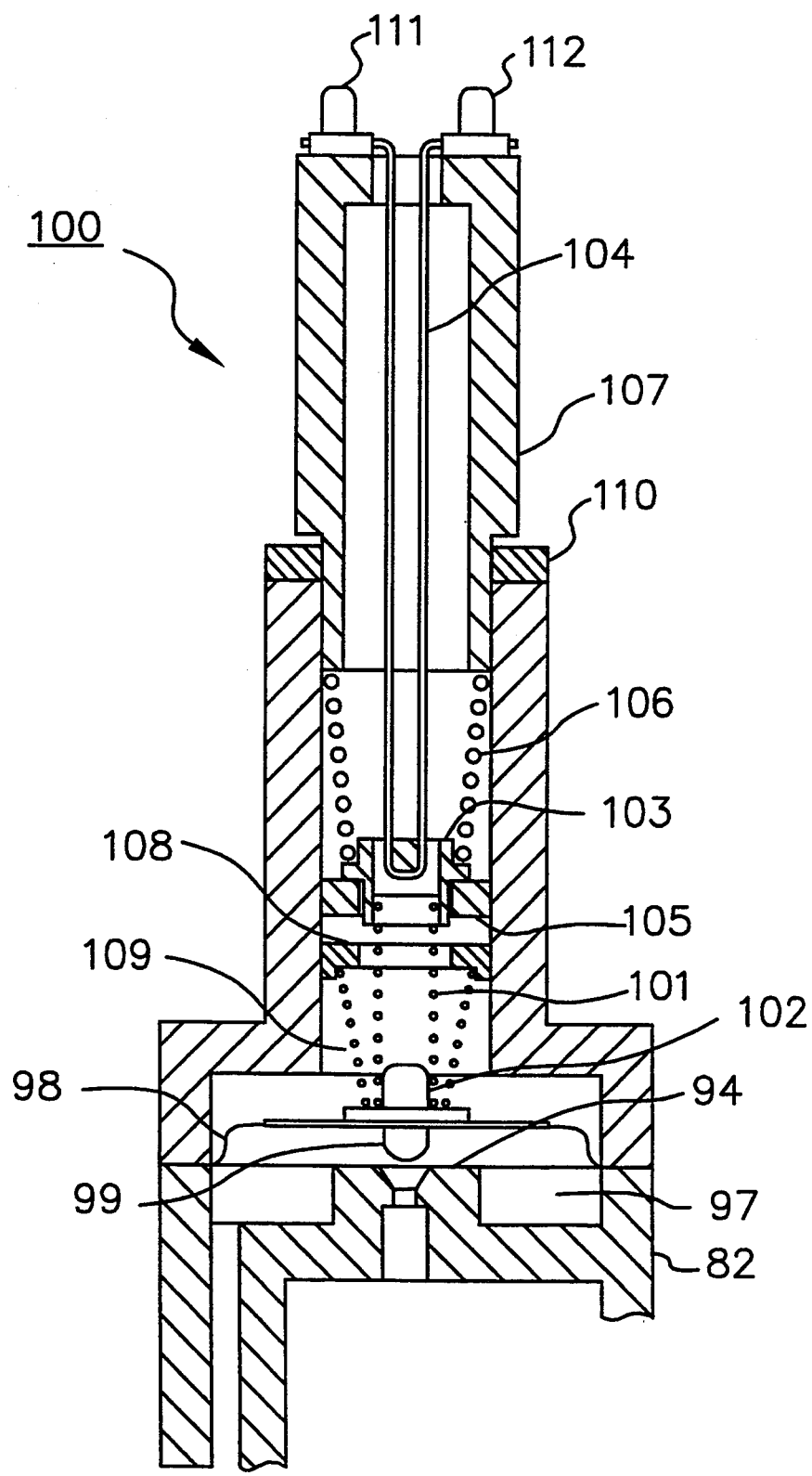
FIG. 4 is an enlarged view of a servo actuator used in the pressure regulator of FIG. 3.

A second embodiment of a modulating pressure regulator valve in accordance with the applicant's invention is illustrated in FIGS. 3 and 4. In FIG. 3, the pressure regulator valve is generally identified by reference numeral 80. It comprises a housing including a main valve body 81 and a servo valve body 82. Main valve body 81 defines a fluid inlet passageway 83 and a fluid outlet passageway 84 between which fluid communication is provided through a main valve having a stationary valve seat 85 and a main valve closure member or disc 86.

The position of closure member 86 relative to valve seat 85 is determined by a diaphragm actuator 87, which, in the embodiment shown in FIG. 3, is on the opposite side of valve seat 85 from closure member Closure member 86 is connected to diaphragm 87 through a stud 88 having a ball on the free end thereof which mates with a socket in the closure member. A compression spring 89 is positioned between valve seat 85 and diaphragm 88, and serves to bias the main valve toward a closed state.

The upper side of diaphragm 87, as shown in FIG. 3, is exposed to the pressure in outlet passageway 84. Thus, the outlet pressure also tends to close the main valve. The forces exerted on diaphragm 87 by spring 89 and the outlet pressure are opposed by the pressure in a pressure chamber 90 formed between the bottom side of diaphragm 87 and a portion of main valve body 81.

The control pressure in pressure chamber 90 is generated by a servo regulator valve within valve body 82, and is communicated to pressure chamber 90 through a control passageway 91. More specifically, servo valve body 82 is separated into two compartments by means of a partition containing a stationary valve seat 94. The first compartment functions as a manifold 95 which is supplied with fluid from inlet passageway 83 through a flow restrictor 96, and from which the control pressure is supplied to chamber 90.

The second compartment, which functions as servo regulator pressure chamber 97, is defined by the partition containing valve seat 94 and a servo regulator diaphragm 98 which carries a servo valve closure member 99, and positions member 99 relative to valve seat 94. The pressure in chamber 97 is communicated thereto from the fluid outlet passageway. Thus, a decrease in outlet pressure tends to cause diaphragm 98 to close the servo valve, and reduce the pressure bleed off from manifold 95 to the outlet passageway. This increases the pressure in manifold 95 and pressure chamber 90, thereby causing diaphragm 87 to open the main valve and restore the outlet pressure to its desired value.

The position of servo regulator closure member 99 relative to valve seat 94 is also affected by an electrically controlled actuator assembly generally identified by reference numeral 100. Actuator assembly 100 includes a regulator compression spring 101 positioned between a first spring retainer 102 on the top side of diaphragm 98 and a second spring retainer 103 whose position can be electrically varied by means of an actuator comprising a wire segment 104 of a shape memory alloy material. Spring retainer 103 is biased against an adjustable stop 105 by means of a compression spring 106 between an upwardly facing shoulder on retainer 103 and a downwardly facing shoulder on an actuator housing tube 107, of which one end has an external thread which mates with an internal thread in a bore in housing 82. The same threaded bore in housing 82 also accommodates adjustable stop 105 and an additional adjustable spring retainer 108. A compression spring 109 is positioned between spring retainer 102 and retainer 108, and functions to set the minimum regulated pressure limit for pressure regulator valve 80.

As indicated, stop 105, actuator housing 107 and spring retainer 108 are threaded into the bore in housing 82, and their positions along the length of the bore can be adjusted as desired. The position of stop 105 determines the maximum regulated pressure limit for pressure regulator valve 80. The adjustable feature of actuator housing 107 permits appropriate adjustment for the length of wire segment 104.

Figure 2:
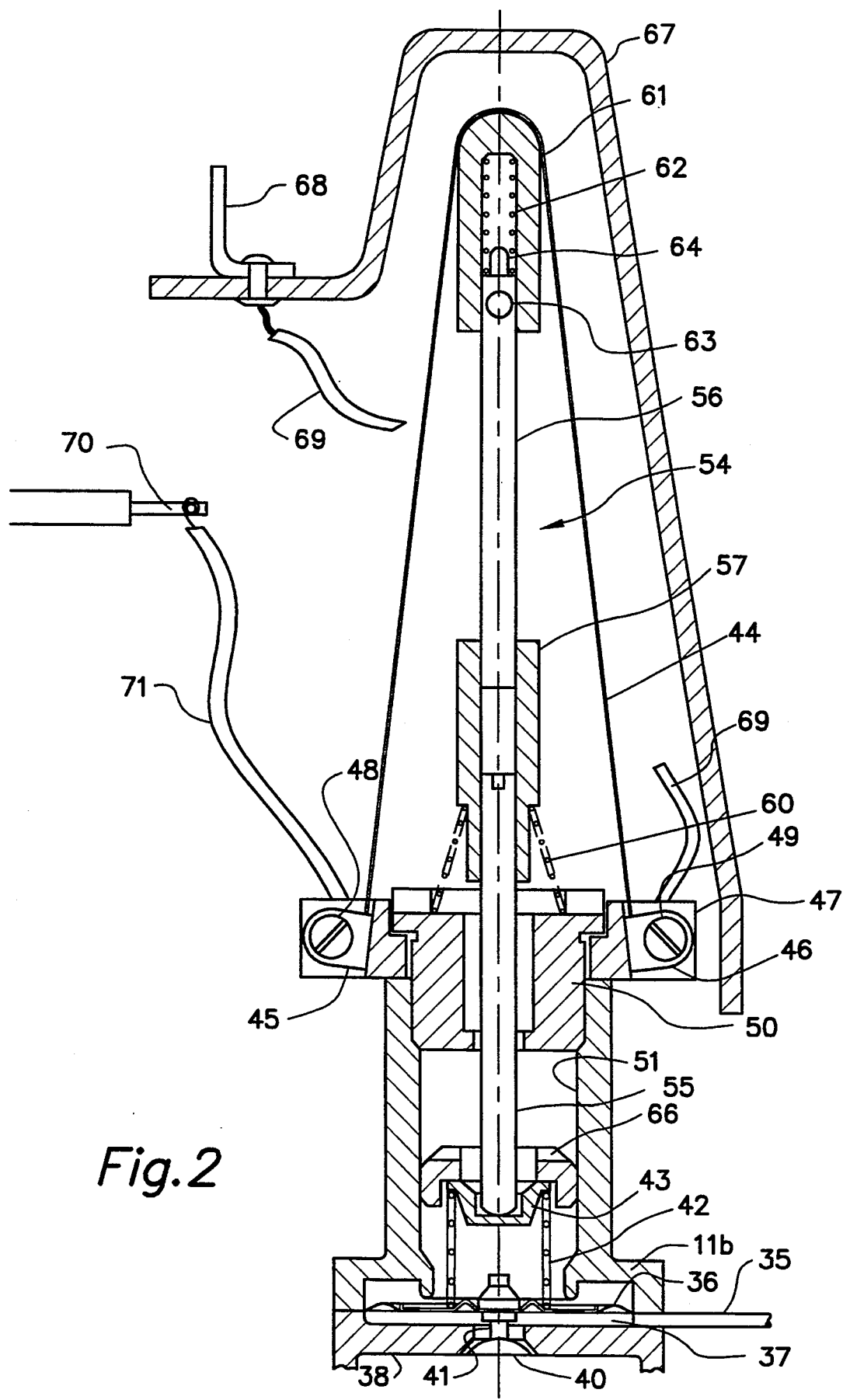
FIG. 2 is an enlarged view of a servo actuator used in the gas valve of FIG. 1.

The operation of actuator 100 is opposite that of the actuator of FIG. 2 in that heating of wire segment 104 to decrease its length decreases the output pressure of valve 80. However, the principles of operation of both actuators are otherwise similar. Specifically, with wire segment 104 at below its transition temperature, spring retainer 103 is positioned against stop 105. This causes maximum downward force to be applied to diaphragm 98 by springs 101 and 109, and results in maximum closure of the servo valve.

As wire segment 104 is heated above its transition temperature, its length. shortens and it repositions retainer 103 upwardly against the bias of spring 106. This reduces the compression of regulator spring 101, and permits increased opening of the servo valve, which, in turn, decreases the pressure in chamber 90. This tends to close the main valve and decrease the output pressure. Conversely, as wire segment 104 is cooled to below its transition temperature its length increases, which permits spring retainer 103 to return to its position against stop 105.

Reference numeral 110 identifies a lock nut for locking actuator housing 107 in place relative to housing 82 once appropriate adjustment has been achieved. Reference numerals 111 and 112 identify electrical terminals through which current can be caused to flow through wire segment 104 to increase its temperature.

In accordance with the foregoing discussion, the applicant's unique electrically controlled pressure regulator valve is simple, compact and quiet in operation, thereby overcoming the disadvantages of previous electrically controlled pressure regulator valves.

The embodiments of the invention in which an exclusive property or right is claimed are defined as follows.

1. A modulating pressure regulator, comprising:
   housing means defining fluid inlet and fluid outlet passageways and a main valve seat providing for flow between the fluid inlet and fluid outlet passageways;
   a main valve closure member mounted in said housing means for movement relative to the main valve seat for varying the flow between the fluid inlet and outlet passageways;
   a main valve actuator operable to vary the position of said main valve closure member relative to the valve seat in response to variations in a control pressure;
   servo valve means for producing the control pressure in response to the pressure in the fluid outlet passageway, the control pressure further being dependent on variable biasing means having a servo valve actuator formed of shape memory alloy material, the servo valve actuator acting through a spring element and adapted to change deformation of the spring element in response to varying temperature; and
   heating means for varying the temperature of the servo valve actuator in response to an electrical control signal.

2. The modulating pressure regulator of claim 1 wherein said servo valve means comprises:
   a servo valve housing;
   a first diaphragm having first and second sides mounted in said servo valve housing, said servo valve housing and said first diaphragm being configured and cooperating to form a first pressure chamber between said servo valve housing and the first side of said first diaphragm;
   a sensing passageway between the first pressure chamber and the fluid outlet passageway in said housing means for supplying the fluid outlet pressure to the first pressure chamber a first compression spring having first and second ends, the first end being positioned to exert force on the second side of said first diaphragm so as to displace said first diaphragm toward the first pressure chamber;

an elongated actuator element of shape memory alloy material whose length decreases with increasing temperature, said elongated actuator element having first and second spaced apart locations thereon, the first location being held in a fixed position relative to said servo valve housing;

linkage means extending between the second location on said elongated actuator element, and the second end of said spring, said servo valve housing, said elongated actuator element and said linkage means being arranged to vary the compression of said first compression spring between said linkage means and said first diaphragm as the temperature of said elongated actuator element is increased;

electrical terminal means on said elongated actuator element for connection to a source of electric current, said electrical terminal means being located to produce an electric current path through at least a portion of said elongated actuator element between the first and second locations thereon;

control passageway means for providing fluid communication between the fluid outlet passageway and said main valve actuator through a stationary valve seat of said servo valve means, said control passageway means supplying the control pressure to said main valve actuator; and a servo valve closure member positioned relative to the stationary valve seat of said servo valve means by said first diaphragm.

3. The modulating pressure regulator of claim 2 wherein said control passageway means includes a manifold, a first conduit containing a flow restrictor connecting the inlet passageway in said housing means to the manifold, and second conduit connecting the manifold through the valve seat of said servo valve means and the first pressure chamber to the outlet passageway in said housing means and a third conduit connecting the manifold to said main valve actuator.

4. The modulating pressure regulator of claim 3 wherein:

said main valve actuator includes a second diaphragm having first and second sides mounted in said housing means, said second diaphragm and said housing means being configured and cooperating to form a second pressure chamber between said housing means and the first side of said second diaphragm, the first control pressure being supplied to the second pressure chamber through the third conduit;

said main valve closure member is connected to the second diaphragm to be positioned thereby relative to the main valve seat; and spring biasing means is provided, said spring biasing means being arranged to tend to move said main valve closure member toward the main valve seat.

5. The modulating pressure regulator of claim 4 wherein:

said linkage means includes push rod means having first and second ends, the push rod means being positioned with its first end proximate the second end of said first compression spring and extending outwardly therefrom to the second end thereof;

said elongated actuator element is in the form of a wire segment having the first location thereon at one end of the segment and the second location thereon at an intermediate point on the segment, and having a third location thereon at the other end of the segment, the elongated actuator element being attached to said servo valve housing at the first and third locations on the elongated actuator element and passing around the second end of said push rod means at the second location on said elongated actuator element; and said electrical terminal means are connected to said elongated actuator element at the first and third locations thereon.

6. The modulating pressure regulator of claim 5 wherein:

said elongated actuator element is arranged to move the push rod means toward said first compression spring;

the push rod means includes a telescoping portion biased toward an extended state by means of a second compression spring having a larger spring constant than that of said first compression spring;

the valve seat of said servo valve means and said servo valve closure member are arranged so that decreasing pressure in the first pressure chamber tends to open said servo valve means; and the main valve seat and said main valve closure member are arranged so that decreasing pressure in the second pressure chamber tends to move said main valve closure member further from the main valve seat.

7. The modulating pressure regulator of claim 5 wherein:

the push rod means is biased toward said first compression spring by means of a second compression spring having a larger spring constant than that of said first compression spring;

said elongated actuator element is arranged to move the push rod means away from said first compression spring;

the valve seat of said servo valve means and said servo valve closure member are arranged so that decreasing pressure in the first pressure chamber tends to close said servo valve means; and the main valve seat and said main valve closure member are arranged so that decreasing pressure in the second pressure chamber tends to move said main valve closure member toward the main valve seat.

8. A method of electrically varying the set point pressure of a pressure regulator in which fluid flow between an inlet and an outlet is controllable by a main valve in response to a control pressure produced by a servo valve, the servo valve being responsive to fluid pressure at the regulator outlet and the relative compression of a servo valve spring, the method comprising the steps of:

providing a servo valve actuator formed of shape memory alloy material in an arrangement adapted to change deformation of a servo valve spring in response to increases in temperature of the servo valve actuator; and variably heating the servo valve actuator in response to an electrical control signal.

9. The method of claim 8 wherein the step of providing a servo valve actuator formed of shape memory alloy material comprises providing a wire segment of shape memory alloy material having its ends held at a fixed location and a location on the wire segment between its ends operatively connected to the servo valve spring.

10. The method of claim 9 wherein the step of variably heating the servo valve actuator comprises causing electric current to flow through at least a portion of the wire segment between its ends.

11. The method of claim 10 wherein the step of providing a servo valve actuator further comprises arranging the wire segment so as to directly compress the servo valve spring.

12. The method of claim 10 wherein the step of providing a servo valve actuator further comprises:
   providing a compression spring having a spring constant larger than that of the servo valve spring in an arrangement in which the compression spring is adapted to compress the servo valve spring; and
   arranging the wire segment so as to compress the compression spring.

13. In a pressure regulator of the type having a main valve for controlling fluid flow between an inlet and an outlet, the main valve being controllable by a control pressure produced by a servo valve in response to pressure magnitude at the regulator outlet and the amount of force applied by a servo regulator spring element, the improvement which-comprises:
   a servo valve actuator formed of shape memory alloy which changes from a first configuration to a second configuration as its temperature is increased;
   mechanical linkage connecting said servo valve actuator to the servo regulator spring element so that deformation of the spring element is varied as said servo actuator changes from its first configuration to its second configuration; and
   heating means associated with said servo valve actuator for changing the temperature thereof in response to an electrical control signal, whereby the outlet pressure of the pressure regulator can be electrically modulated.

14. The pressure regulator of claim 13 wherein said servo valve actuator comprises a wire segment of shape memory alloy having its ends held at fixed positions and having an intermediate location thereon between the ends thereof operatively connected to said mechanical linkage, the shape memory alloy being of a composition which causes the wire segment to shrink in length as its temperature is increased.

15. The pressure regulator of claim 14 wherein said heating means comprises electrical terminals at spaced locations on the wire segment for receiving electric current from a current source and producing current flow through at least a portion of the wire segment between the ends thereof.

16. The pressure regulator of claim 15 wherein:
   the servo valve includes a pressure chamber bounded in part by a resilient diaphragm adapted to position a valve closure member relative to a valve seat through which the control pressure is communicated; and
   the servo regulator spring is a first compression spring located between the diaphragm and said mechanical linkage.

17. The pressure regulator of claim 16 wherein said mechanical linkage includes push rod means positioned between the first compression spring and the intermediate location on the wire segment.

18. The pressure regulator of claim 17 wherein the wire segment is arranged to move the push rod means toward the first compression spring.

19. The pressure regulator of claim 18 wherein the push rod means includes a telescoping portion biased toward an extended state by a second compression spring having a larger spring constant than that of the first compression spring.

20. The pressure regulator of claim 17 wherein:
   the push rod means is biased toward the first compression spring by means of a second compression spring having a larger spring constant than that of the first compression spring; and
   the wire segment is arranged to move the push rod means away from the first compression spring.

* * * * *

UNITED STATES PATENT AND TRADEMARK OFFICE
CERTIFICATE OF CORRECTION

PATENT NO.   : 5,345,963
DATED        : Sep. 13, 1994
INVENTOR(S)  : Paul Dietiker It is certified that error appears in the above-identified patent and that said Letters Patent is hereby corrected as shown below:

Column 7, line 55, delete "first".

Signed and Sealed this

Twenty-seventh Day of December, 1994

Attest:

BRUCE LEHMAN

*Attesting Officer*          *Commissioner of Patents and Trademarks*